(12) United States Patent
Bouchilloux

(10) Patent No.: US 9,383,434 B2
(45) Date of Patent: Jul. 5, 2016

(54) COMPACT OPTO-ELECTRONIC SENSOR MODULES FOR DETECTING GESTURES OR OTHER MOVEMENTS BY A USER

(71) Applicant: Heptagon Micro Optics Pte. Ltd., Singapore (SG)

(72) Inventor: Philippe Bouchilloux, Singapore (SG)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 14/503,611

(22) Filed: Oct. 1, 2014

(65) Prior Publication Data

US 2015/0090884 A1    Apr. 2, 2015

Related U.S. Application Data

(60) Provisional application No. 61/885,297, filed on Oct. 1, 2013.

(51) Int. Cl.
| | | |
|---|---|---|
| *G01S 3/786* | (2006.01) | |
| *G01S 7/481* | (2006.01) | |
| *G06F 3/01* | (2006.01) | |
| *G01S 17/46* | (2006.01) | |
| *G01S 17/87* | (2006.01) | |

(52) U.S. Cl.
CPC ............... *G01S 7/4813* (2013.01); *G01S 17/46* (2013.01); *G01S 17/87* (2013.01); *G06F 3/017* (2013.01)

(58) Field of Classification Search
CPC ....... H01L 25/167; H01L 33/58; H01L 27/144; G01S 3/786
USPC ........................................................ 250/341.8
See application file for complete search history.

(56) References Cited

U.S. PATENT DOCUMENTS

| | | | |
|---|---|---|---|
| 2010/0238139 A1* | 9/2010 | Goertz et al. | 345/175 |
| 2010/0295781 A1* | 11/2010 | Alameh et al. | 345/158 |
| 2011/0063253 A1* | 3/2011 | Kiyose | 345/175 |
| 2011/0304589 A1* | 12/2011 | Yoshida | 345/175 |
| 2012/0074301 A1* | 3/2012 | Kroese et al. | 250/226 |
| 2012/0280107 A1 | 11/2012 | Skurnik et al. | |
| 2012/0280904 A1 | 11/2012 | Skurnik et al. | |
| 2014/0085245 A1* | 3/2014 | Baldwin et al. | 345/174 |

* cited by examiner

*Primary Examiner* — Marcus Taningco
(74) *Attorney, Agent, or Firm* — Fish & Richardson P.C.

(57) ABSTRACT

Compact opto-electronic sensor modules are described that allow detection of an object's motion occurring in spatial regions (e.g., quadrants) that are located primarily directly about the surface of a device in which the module is located. For example, light (e.g., infra-red) from a light emitting element in the module can illuminate substantially all, or at least a significant percentage of, areas in a plane directly above the surface of the device. Each of multiple light detecting elements in the module can be arranged to receive light from a respective detection zone directly above the surface of the device.

23 Claims, 12 Drawing Sheets

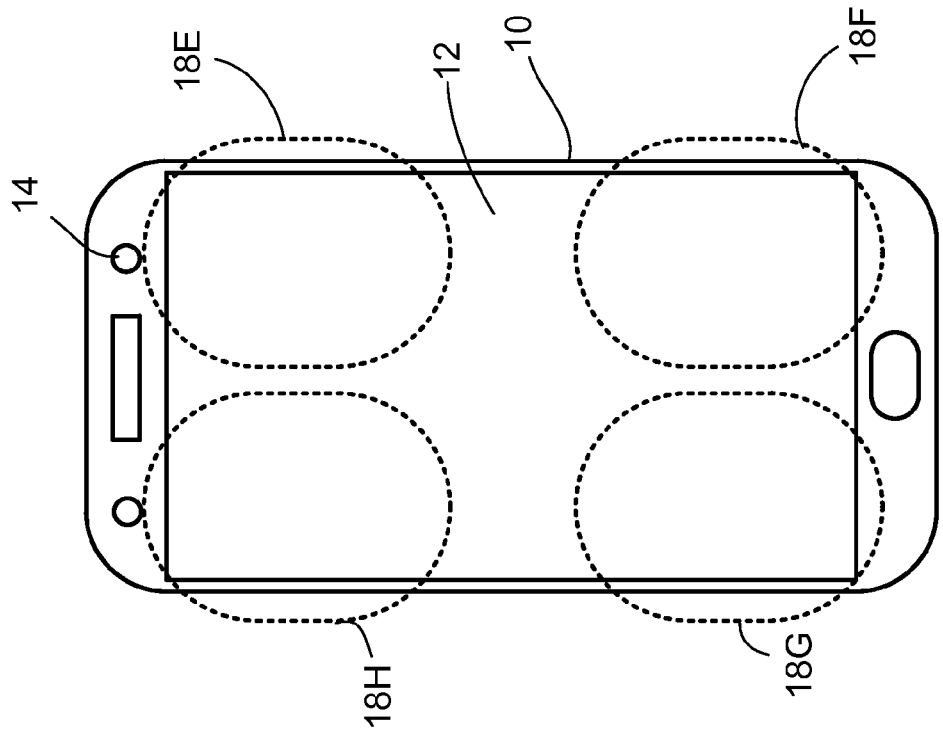
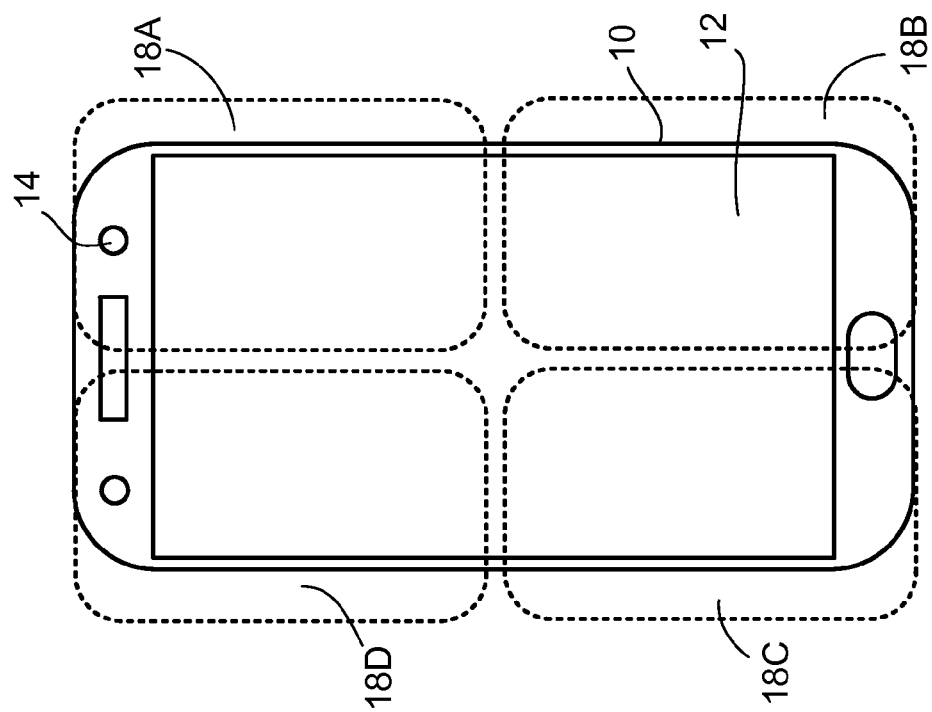

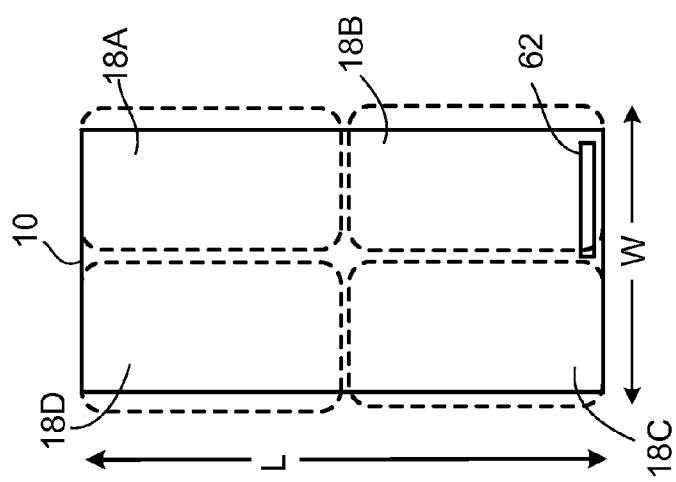
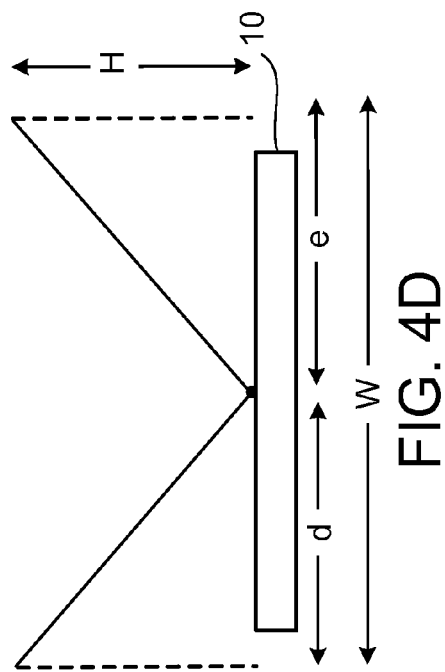
FIG. 4D
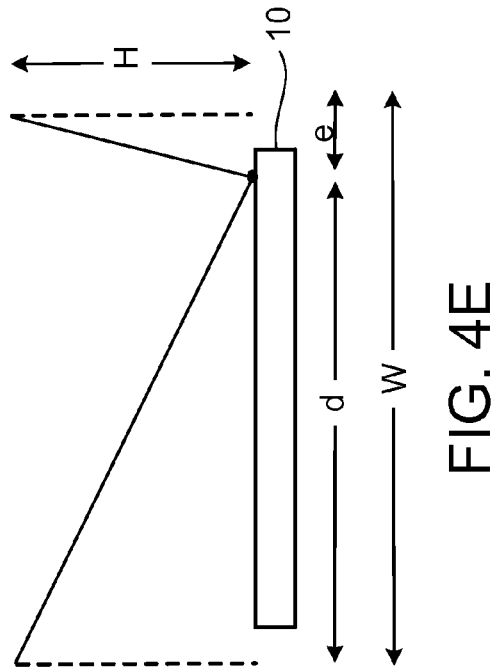
FIG. 4E

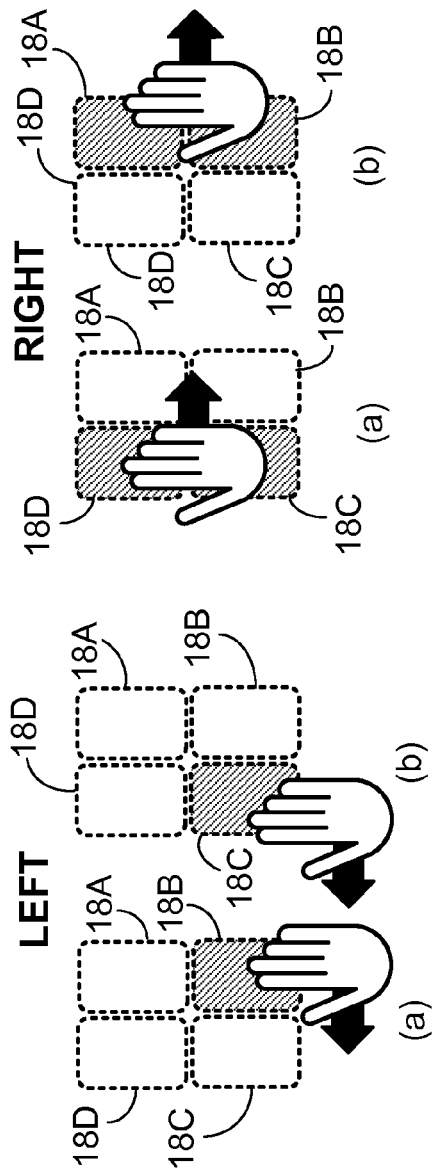
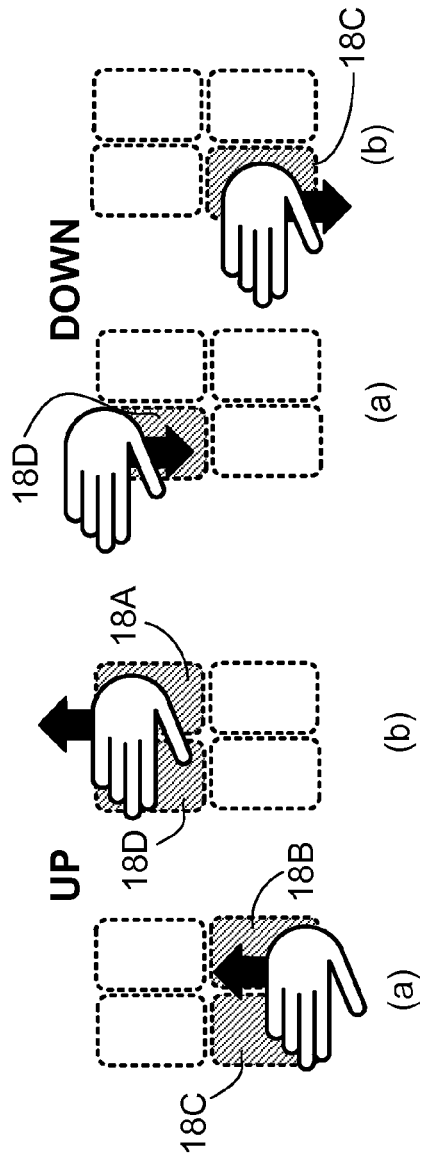
FIG. 7A  FIG. 7B  FIG. 7C  FIG. 7D

COMPACT OPTO-ELECTRONIC SENSOR MODULES FOR DETECTING GESTURES OR OTHER MOVEMENTS BY A USER

CROSS-REFERENCE TO RELATED APPLICATION(S)

This application claims the benefit of priority of U.S. Provisional Patent Application No. 61/885,297, filed on Oct. 1, 2013. The contents of the earlier application are incorporated herein by reference in their entirety.

FIELD OF THE DISCLOSURE

The present disclosure relates to compact opto-electronic sensor modules that can detect hand gestures or other movements by a user without the user needing to touch the module or the device in which the module resides.

BACKGROUND

A gesture sensor is a device that enables the detection of physical movement without the user having to contact the device within which the gesture sensor resides. Detected movements can be used, for example, as input commands for the device. Gesture sensors are commonly used in handheld computing devices, such as tablets and smartphones, and other portable computing devices, such as laptops, as well as in video game consoles.

Some gesture sensors include one or more light emitting elements and one or more light detecting elements. A control circuit can implement an algorithm that uses the positions of the light emitting and/or light detecting elements, as well as the received sensed data, to determine relative movement of a target (e.g., a person's hand or finger moving across the space above the surface of the sensor).

SUMMARY

Compact opto-electronic sensor modules are described that allow detection of an object's motion occurring in spatial regions (e.g., quadrants) that are located primarily directly about the surface of a device in which the module is located. For example, light (e.g., infra-red) from a light emitting element in the module can illuminate substantially all, or at least a significant percentage of, areas in a plane directly above the surface of the device. Each of multiple light detecting elements in the module can be arranged to receive light from a respective detection zone directly above the surface of the device.

In some implementations, such a module can be assembled into a hand-held device (e.g., a mobile phone). In some implementations, the light emitting element in the module can illuminate a substantial portion of the space directly above the device's display screen. For example, an optical element (e.g., lens) associated with the light emitting element can direct the light received from the light emitting element so that it illuminates a significant part or substantially all of the space at a distance of about 5-15 cm directly above the surface of the device. An object's motion, such as hand gestures, can be detected more readily by the light detecting elements. Circuitry in the module and/or the device then can process the detected signals to recognize a particular gesture and respond appropriately.

In one aspect, for example, a hand-held device includes an outer surface and at least one opto-electronic module operable to emit and receive light through a window in the outer surface. Each opto-electronic module includes a light emitting element mounted on a first area of a support, and an integrated circuit chip mounted on a second area of the support and including a plurality of light detecting elements. The integrated circuit chip includes circuitry to process signals from the light detecting elements, wherein the light detecting elements and the light emitting element are disposed in respective optical channels of the module. The module further includes a first passive optical element (e.g., a lens) in an optical emission channel associated with the light emitting element and arranged such that light from the light emitting element that passes through the first passive optical element and through the window in the outer surface of the hand-held device has a central axis of emission forming an angle of less than ninety degrees (and, in some cases, less than eight degrees) with the outer surface of the hand-held device. The light spreads so that it subsequently reaches at least part of a specified plane directly above the outer surface of the hand-held device. The module also includes second passive optical elements (e.g., lenses) each of which is in a respective optical detection channel associated with a respective one of the light detecting elements and is arranged to receive light from a different one of a plurality of light detection zones that encompass areas illuminated by the first passive optical element. Each of the second passive optical elements is arranged to direct the received light to an associated one of the light detecting elements in the respective optical detection channel for that passive optical element.

In another aspect, a method of operating an opto-electronic module in a hand-held device includes emitting light from a light emitting element in the module through a first passive optical element in the module such that after passing through the first passive optical element and through an outer surface of the hand-held device, the light has a central axis of emission forming an angle of less than ninety degrees (and, in some cases, less than eighty degrees) with an outer surface of the hand-held device. Light reflected by an object moving above the outer surface of the hand-held device is received, wherein parts of the reflected light are received by respective ones of a plurality of second passive optical elements each of which is arranged to receive reflected light from a different one of a plurality of light detection zones directly above the outer surface of the hand-held device. The received light is directed from the second passive optical elements to light detecting elements in the module, wherein each light detecting element is associated with a respective one of the second passive optical elements.

An advantage of being able to detect hand gestures in regions directly above the surface of the device is that it allows the hand gestures to be made with a more natural, and less awkward, feeling. Some implementations may allow a wide range of hand gestures or other motion to be detected and recognized.

The modules can be made, for example, in a wafer-level fabrication process and can be made to with compact size having a small foot-print. Thus, the modules are particularly suitable to be integrated into hand-held or other devices in which space is at a premium.

Other aspects, features and advantages will be apparent from the following detailed description, the accompanying drawings, and the claims.

BRIEF DESCRIPTION OF THE DRAWINGS

FIGS. 2A and 2B illustrate examples of a hand-held computing device including a sensor module in accordance with the invention.

FIG. 3A shows a top open view. FIG. 3B shows a cross-sectional side view along line B-B of FIG. 3A. FIG. 3C is a cross-sectional side view along line C-C of FIG. 3A. FIG. 3D is a cross-sectional side view along line D-D of FIG. 3A.

FIG. 4C illustrates possible positions of the sensor module in a hand-held computing device for some implementations.

FIGS. 4D and 4E illustrate various dimensions for sensor module positions in a hand-held computing device.

FIGS. 7A through 7D illustrate examples of hand gestures.

DETAILED DESCRIPTION

Figure 1:
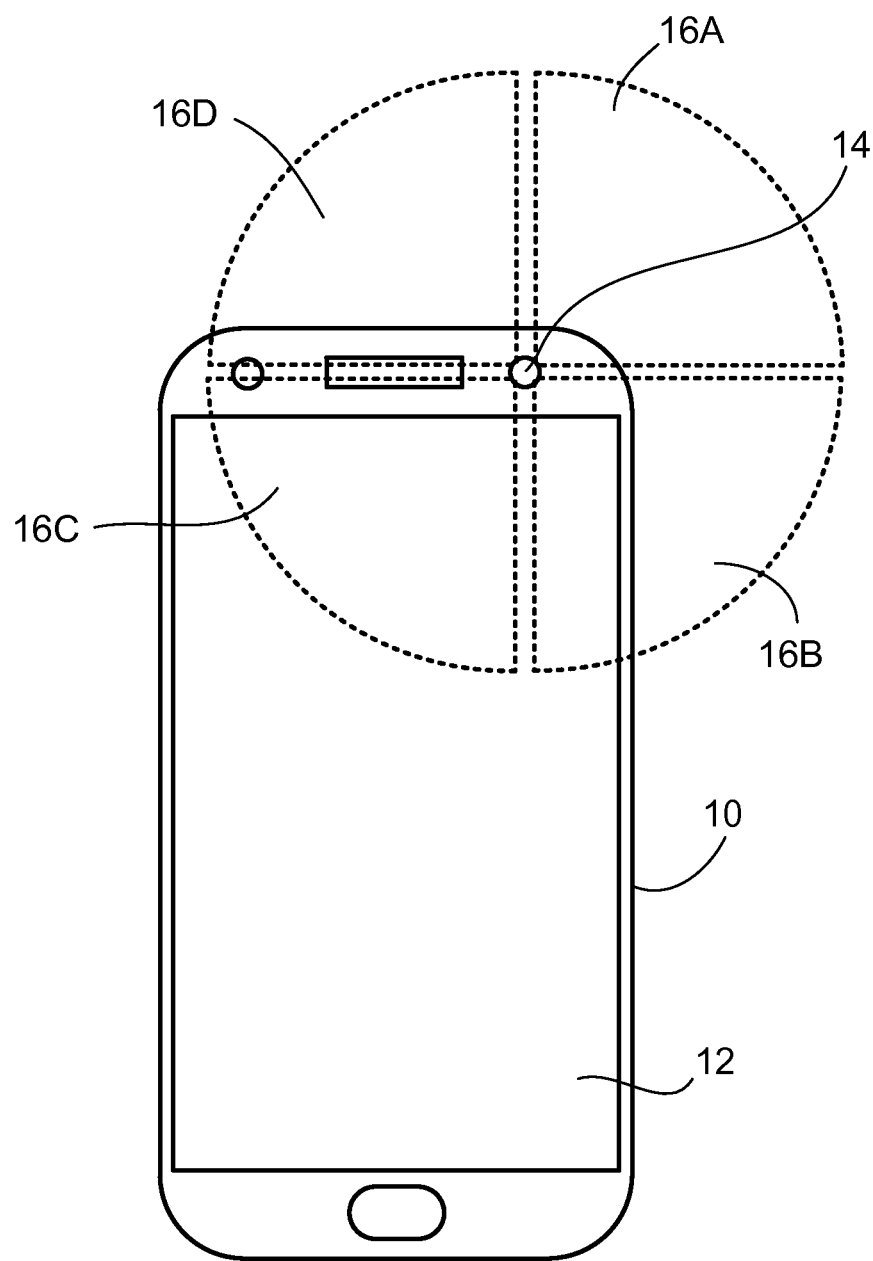
FIG. 1 illustrates an example of a hand-held computing device including a sensor module.

As shown in FIG. 1, a hand-held computing device 10 such as a mobile phone, an electronic tablet or notepad, or a personal digital assistant (PDA), includes an interactive display screen 12 and a small window 14 located near an upper corner on the front side of the device. Beneath the window 14 is an opto-electronic sensor module arranged to emit light signals as well as to detect light signals from multiple different detection zones 16A, 16B, 16C and 16D located above the front surface of the device 10. The window 14 is transparent for the emitted/detected wavelength(s) of light, but need not necessarily be transparent to the visible part of the spectrum. For example, if the light emitted and detected by the sensor module is in the infra-red (IR) range, the window need not be transparent to wavelengths in the visible part of the spectrum; instead, in such an implementation, the window 14 need only be transparent for IR light. The module can include multiple light detecting elements, each of which is arranged to detect light reflected from a respective one of the detection zones 16A-16D. If a user passes her hand over one or more of the detection zones, the sequence in which variations in the light signals are detected by one or more of the light detecting elements can be used by a control circuit to identify and interpret the user's hand gesture. Thus, the sensor module in the device 10 facilitates contactless operation that allows a user to indicate a command or instruction to be performed by the device 10 without the user having to contact the device physically (e.g., by touching the screen 12 with her finger).

The detection zones 16A-16D in FIG. 1, however, are limited to areas that are more or less directly above the window 14 beneath which the gesture sensor module is located. The limited area covered by the combination of the detection zones 16A-16D results in motion detection being off-center with respect to the central axes of the device, which can make it awkward or difficult for a user to perform a desired hand gesture that can be detected readily by the sensor module.

FIG. 2A illustrates another example of a hand-held device 10 that also includes an opto-electronic sensor module located beneath a window 14 near an upper corner on the front side of the device. In this example, however, the module is arranged to emit light such that, when the light is measured at a plane a specified distance above the front surface of the device 10, the light passes through substantially all areas of the plane that are directly above the front surface of the computing device 10. In general, the specified plane falls within an effective detection zone that, in some implementations, is in the range of about 5-15 cm above the front surface of the device 10 (i.e., above the surface of the display screen 12). In other implementations, the specified plane may be somewhat closer to or further away from the surface of the device.

The sensor module of FIG. 2A also includes two or more light detecting elements, each of which is arranged to detect light from a respective detection zone 18A, 18B, 18C or 18D. Each detection zone 18A, 18B, 18C and 18D encompasses a different region directly above the front surface of the device 10 at a specified distance above the front surface of the device (e.g., 5-15 cm). In combination, the detection zones 18A-18D can cover substantially the entire area (or at least a significant portion of the area) of the plane that is directly above the front surface of the device 10. The greater combined area covered by the detection zones 18A-18D (compared to the detection zones 16A-16D of FIG. 1) can make it easier, and less awkward, for a user to perform a desired gesture to be sensed by the sensor module. Although in the illustrated example the size of the area covered by each light detection zone 18A-18D is substantially the same as for the other detection zones, in some implementations this need not be the case. Furthermore, in the example of FIG. 2A, the shape of each detection zone 18A-18D is represented as a quasi-rectangular area. FIG. 2B illustrates another example of a device that includes a sensor module and shows areas encompassed by detection zones 18E, 18F, 18G, 18H. More generally, the particular shape and area encompassed by the detection zones may differ in other implementations. However, preferably, the detection zones should not overlap one another, and each detection zone should cover enough of the space directly above the front surface of the device to allow easy detection of an object within that detection zone.

FIGS. 3A-3D illustrate further details of an example of an opto-electronic sensor module arranged to operate in accordance with multiple detection zones as described above. The module includes a light emitting element 24 and an array of light detecting elements 22 embedded, for example, in an integrated circuit chip 20, which can perform processing of the analog signals from the light detecting elements 22. The light detecting elements are operable to detect light at the same wavelength of light emitted by the light emitting element. The light emitting element 24 can be implemented, for example, as a LED, semiconductor laser or VCSEL that emits infra-red light (e.g., at 940 nm). The light detecting elements 22 can be, for example, 200 μm×200 μm infra-red photodetectors such as photodiodes embedded in the integrated circuit chip 20. Other types of photodetectors having different sizes and arranged to detect other wavelengths, can be used as well. For example, single photon avalanche diodes can be used as the light sensing elements 22. Furthermore, in some implementations, each detector 22 can be formed as an array of tiny detectors (pixels), each of which has the same or slightly different sensing capabilities. This can allow for more complex light signal processing (filtering different wavelengths, for instance).

Figure 3A:
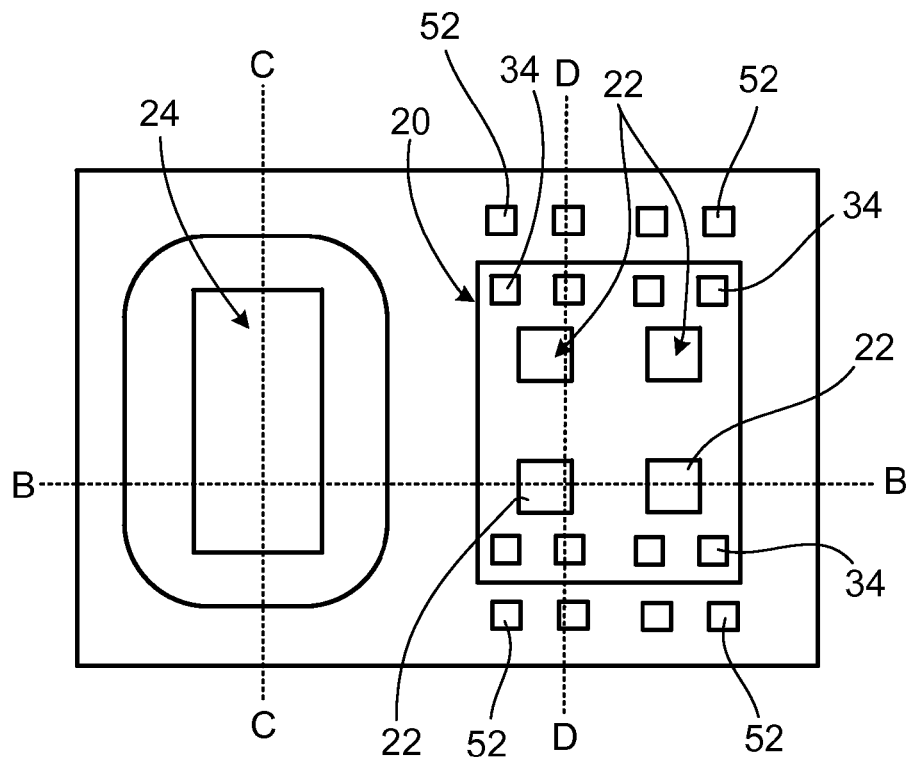
FIGS. 3A-3D illustrate further details of an example of the sensor module according to the invention.
Figure 3B:
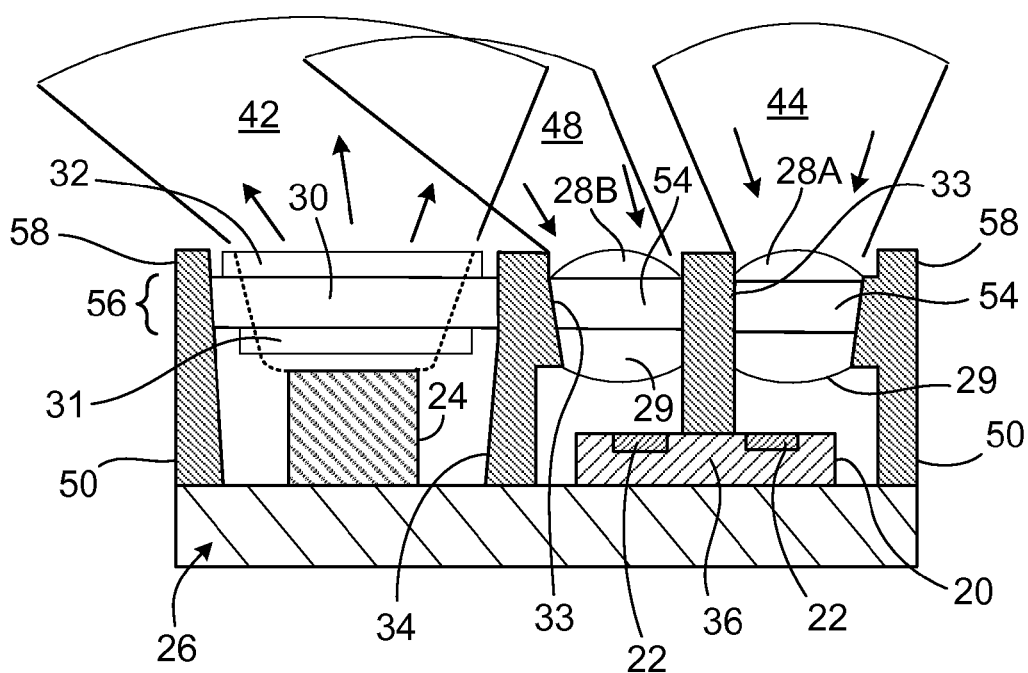
Figure 3C:
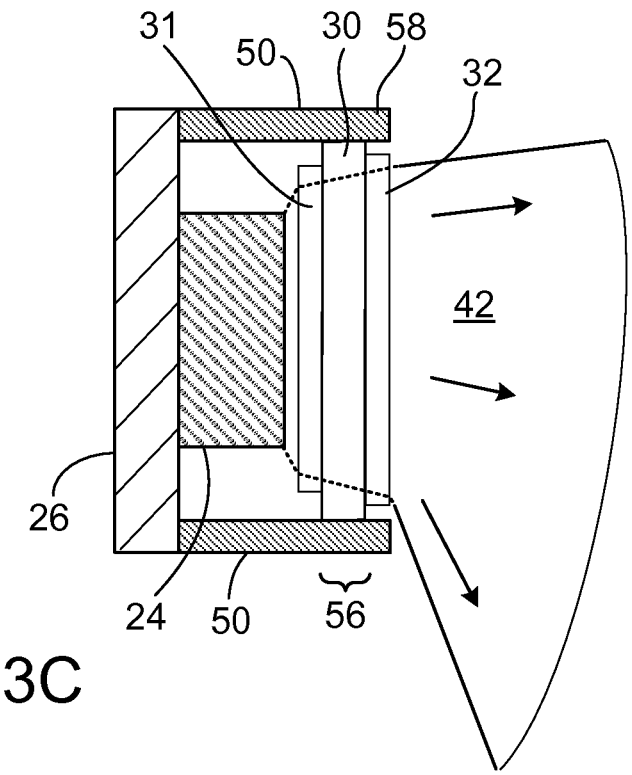
Figure 3D:
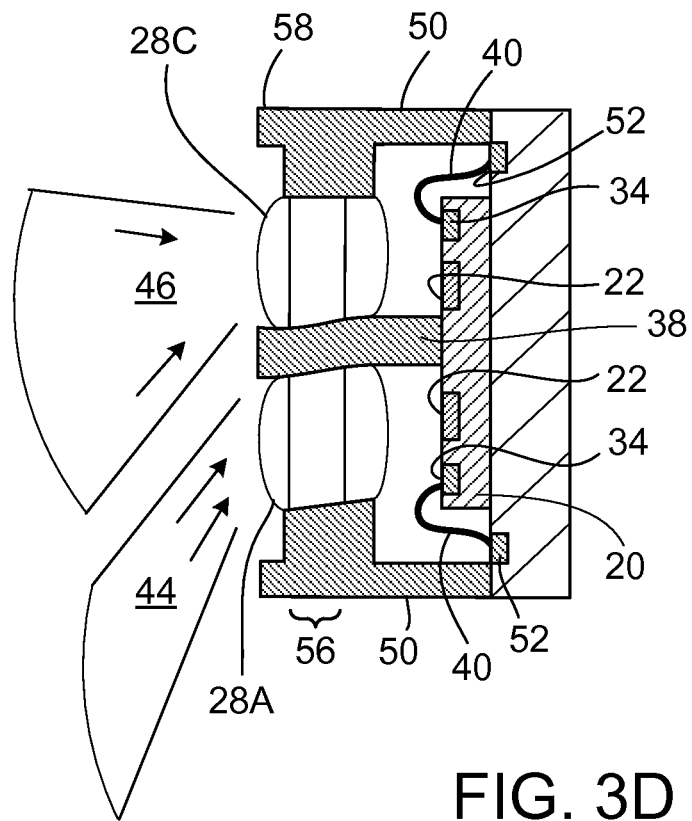

As illustrated in FIGS. 3B and 3D, the light emitting element 24 is separated from the integrated circuit chip 20 (including the array of light detecting elements 22) by a non-transparent wall 34, which helps prevent or reduce optical cross-talk between the light emitting element 24 and the light detecting elements 22. The wall 34 can be composed, for example, of a polymer material (e.g., epoxy, acrylate, polyurethane, or silicone) containing a non-transparent filler (e.g., carbon black, a pigment, inorganic filler, or dye).

Each light detecting element 22 corresponds to a different optical channel in the module and is arranged to detect light from a respective one of the detection zones 18A-18D. Although the illustrated example shows a 2×2 array of light detecting elements 22, some implementations include a lesser or greater number of channels (and a corresponding number of light detecting elements). Thus, some implementations may include as few as two light detecting elements 22, whereas other implementations may include tens of light detecting elements 22. The resolution can be increased by using a greater the number of light detecting elements 22. Preferably, internal non-transparent walls 36, 38 separate adjacent pairs of the light detecting elements 22 from one another. The walls 36, 38 can help reduce or prevent optical cross-talk and light leakage between the channels. The walls 36, 38 also can be composed, for example, of a polymer material (e.g., epoxy, acrylate, polyurethane, or silicone) containing a non-transparent filler (e.g., carbon black, a pigment, inorganic filler, or dye).

Each of the light emitting element 24 and the light detecting elements 22 can be mounted on a support 26 that is composed, for example, of a printed circuit board (PCB) material such as FR4, which is a grade designation assigned to glass-reinforced epoxy laminate material. The integrated circuit chip 20, which performs processing of the analog signals from the light detecting elements 22, can be coupled electrically to one or more respective conductive pads on the support 26. For example, bond wires 40 can connect conductive pads 34 on the integrated circuit chip 20 to conductive pads 52 on the support 26. The conductive pads 52 can be electrically coupled to conductive pads on the exterior of the support 26, for example, using through-plate conductive vias that extend vertically through the support 26. The support 26 together with an outer wall 50 provides a housing or package for the light emitting element 24 and the integrated circuit chip 20.

The foregoing module can be made relatively compact, with a relatively small footprint. For example, the overall dimensions of the module, in some implementations, can be less than 3 mm (length)×2.0 mm (width)×1.5 mm (height). Such small, compact modules can be particularly advantageous for mobile phones and other devices in which space is at a premium. In some implementations, the module can have relatively low power consumption (e.g., <0.5 mW).

The module of FIG. 3A-3D includes various lens elements with optimized beam shaping. The lens elements, which are described in greater detail below, can be provided on the surface of an optics substrate 56 and can be formed, for example, by replication techniques. In particular, a directional projection lens element 32 is located above the light emitting element 24 on a transmissive portion 30 of the optics substrate 56. The directional projection lens 32 can be composed, for example, of a diffractive lens, in particular a Fresnel lens, or a Fresnel lens with multiple sections. In some implementations, folded optical elements (e.g., mirrors, prisms or other reflective surfaces) can be used to change the angle of the source light. In some implementations, the lens 32 helps direct the light 42 emitted by the light emitting element 24 over substantially the entire front surface of the device 10 at a specified distance from the surface of the device 10. In particular, the light 42 from the light emitting element 24, after passing through the lens 32, has a central axis of emission forming an angle of less than ninety degrees (and in some cases, less than eighty degrees) with the outer surface of the hand-held and spreads so that the light subsequently reaches at least part, and in some cases substantially all areas, of a plane directly above the front surface of the device 10 (i.e., where the plane preferably is located a specified distance (e.g., 5-15 cm) above the front surface of the device 10). In the present application, the central axis (or direction) of emission refers to the central direction of emission as shaped by the passive optical element(s) 32 and indicates the mean direction of the emitted light resulting from a weighted average of a directional emission characteristic (e.g., intensity). Some implementations include a second lens 31 attached to the opposite side of the optics substrate 56. The second lens 31 can help direct the light from the light emitting element 24 toward the directional projection lens 32.

The module also includes a respective lens element 28 (e.g., lens elements 28A, 28B, 28C in FIGS. 3A-3D) over each of the light detection elements 22 for each detection optical channel. The lens elements 28 can be formed, for example, by a replication technique, on respective transmissive portions 54 of the optics substrate 56. In some implementations, folded optical elements (e.g., mirrors, prisms or other reflective surfaces) can be used to capture and guide the light. In particular, light reflected from a moving target (e.g. a user's hand) and reaching the lens elements 28 can be focused by the lens elements toward the corresponding light detecting elements 22. Each lens element 28 is configured to receive light from a respective one of the light detection zones 18A-18D. Thus, whereas illumination from the light emitting element 24 covers substantially the entire space in a specified plane above the device 10, each light detecting element 22 preferably is arranged to receive light from only a single detection zone 18A-18D in that same plane. For example, lens element 28A can be configured to receive light 44 from zone 18B, lens element 28B can be configured to receive light 48 from zone 18C, and lens element 28C can be configured to receive light 46 from zone 18A. A fourth lens element (not shown) can be configured to receive light from zone 18D. Each lens element 28 directs incoming light to one of the light detecting element 22 in the corresponding optical channel.

Each of the lens elements 28 can be surrounded by a non-transparent material 33 such that lens elements in adjacent optical detection channels (e.g., lens elements 28A and 28B; or lens elements 28A and 28C) are separated from one another by the non-transparent material. The non-transparent material 33 can be composed, for example, of a PCB material, such as FR4, or other molded or machined material such as a non-transparent epoxy. The non-transparent material 33 between the adjacent lens elements, as well as the non-transparent walls 36, 38, helps isolate the optical detection channels from one another and can help prevent or reduce optical cross-talk.

In some implementations, a second lens element 29 for each optical detection channel is provided on the sensor-side surface of the optical substrate to help focus the incoming light to the corresponding light detecting element 22. The module further can include a baffle 58, which also can be composed, for example, of a non-transparent material.

Although FIG. 2A shows an example in which the sensor module is located near the top right-hand corner of the device 10, in other implementations the sensor module can be located elsewhere in the device (e.g., the top left-hand corner of the device 10). For some applications (e.g., mobile phones, in which the display screen 12 is relatively small), the location of the sensor module may dictate certain aspects of the optics design. Changing the position of the sensor module may, thus, require modifying the optics design in some cases.

Figure 4A:
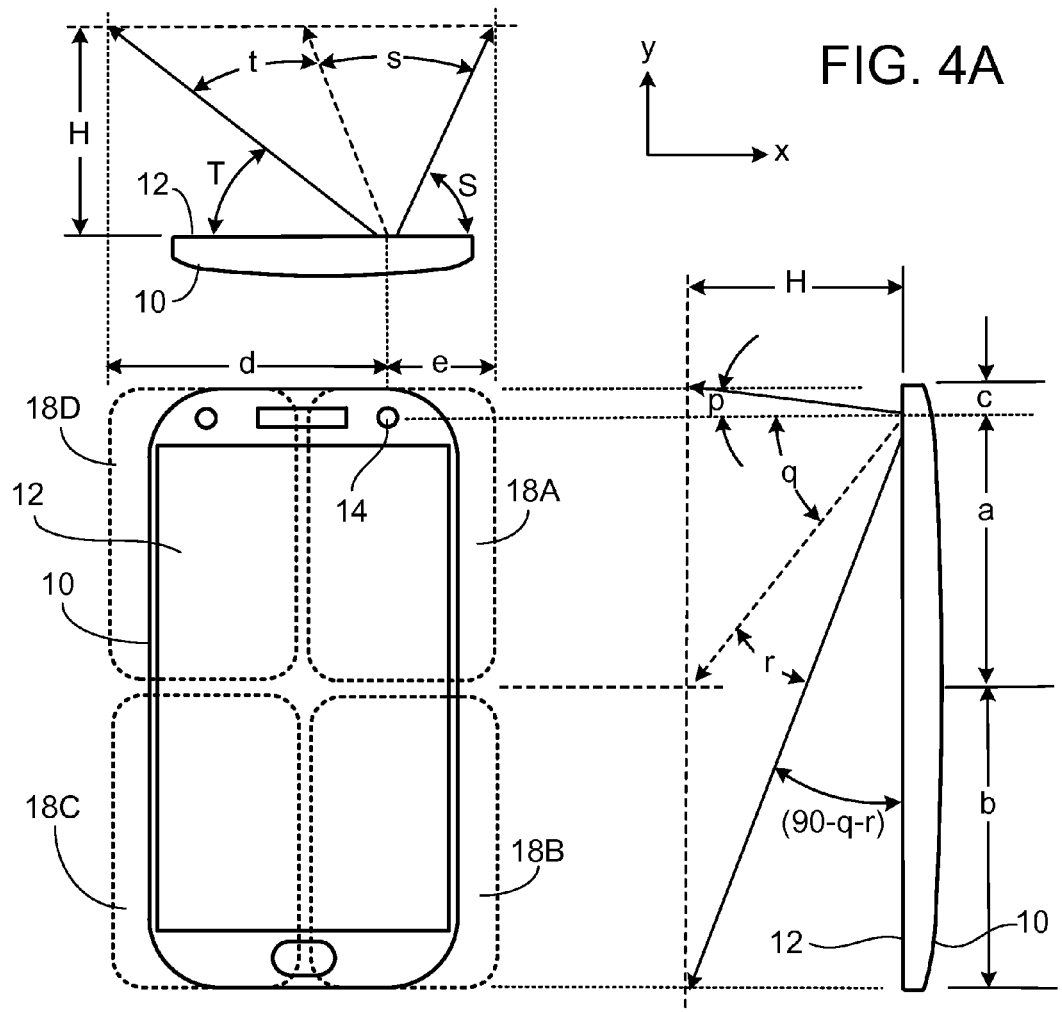
FIG. 4A is an example showing details of light detection zones.

FIG. 4A illustrates an example of the different fields of view (FOV) in the plane x-y plane corresponding to each of the optical detection channels of FIGS. 2 and 3. Here, the x-y plane is perpendicular to the front surface of the device 10. Thus, the lens element 28 for a first one of the optical channels is configured to have a FOV of $(p+q)°$ along the vertical (y) axis, and a FOV of $(s)°$ along the horizontal (x) axis. The lens 28 for a second one of the optical channels is configured to have a FOV of $(r)°$ along the vertical (y) axis, and a FOV of $(s)°$ along the horizontal (x) axis. The lens 28 for a third one of the optical channels is configured to have a FOV of $(p+q)°$ along the vertical (y) axis, and a FOV of $(t)°$ along the horizontal (x) axis. The lens 28 for a fourth one of the optical channels is configured to have a FOV of $(r)°$ along the vertical (y) axis, and a FOV of $(t)°$ along the horizontal (x) axis. The range of angles subtended by each lens 28 in the x and y directions differs from that of each of the other lenses 28 such that the overall range of angles subtended by all the lenses 28 in combination is greater than that of any individual lens.

Figure 4B:
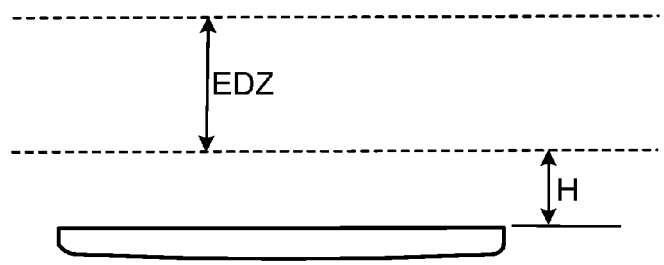
FIG. 4B illustrates an example of an effective detection zone with respect to a specified surface.

As a particular example, the values of p, q, r, s and t in FIG. 4A can be, respectively, 9°, 51°, 18°, 49° and 30°. Examples of the values for S and T in FIG. 4A are, respectively, 63° and 38°. Likewise, examples of the dimensions a, b, c, d, e and H in FIG. 4A are, respectively, 6.2 cm, 7.0 cm, 0.8 cm, 6.5 cm, 2.5 cm and 5.0 cm. Using the foregoing values allows hand gestures at a height of about 5 cm above the front surface of the device 10 to be detected using modest illumination angles of less than 80° (i.e., p+q+r<80°, and s+t<80°). As illustrated in FIG. 4B, the effective detection zone ("EDZ") in which hand gestures can be detected typically can extend somewhat higher than the value of H (i.e., higher than 5.0 cm in the foregoing example). For example, in the illustrated example, the effective detection zone may extend from about 5.0-15.0 cm. Thus, in the foregoing example, hand gestures performed at a distance of about 5.0-15.0 cm from the surface of the device's display screen 12 can be detected even if the hand gestures are not directly above the window 14 where the gesture sensor module is located.

To be able to detect hand gestures above substantially the entire front surface of the device 10 at a smaller height in the illustrated module would require a wider angle of illumination. For example, a height of H=2 cm would require an illumination angle of about p+q+r=100°. Any or all of the foregoing values may differ for other implementations.

FIGS. 4C, 4D and 4E illustrate further examples of possible locations of the sensor module in some hand-held computing devices such as a smartphone 10. For the purpose of illustration, it is assumed that the smartphone 10 has a width of about 6 cm and a length of about 12 cm. The sensor module can be located, for example, anywhere within a zone 62 near the bottom (or top) of the smartphone 10. Thus, in the illustrated implementation, the sensor module can be placed anywhere within a zone 62 that extends from the centerline of the smartphone 10 to about 0.5 cm from the edge of the smartphone (i.e., near a corner of the smartphone).

FIG. 4D illustrates an example in which the sensor module is located at the centerline near the bottom (or top) of the smartphone 10 and where the detection zones 18A-18D extend about 0.5 cm beyond the edges of the smartphone (in the width direction). In that case, as shown in FIG. 4C, W=7 cm and L=12 cm. Thus, d=e=3.5 cm (see FIGS. 4A and 4D). It also can be assumed that c=0.5 cm (FIG. 4A). The sensor module can be arranged such that, for H=5 cm, the illumination angle (t+s) in the first plane is about 70.0°, and the illumination angle (p+q+r) in the second plane is about 72.2°. On the other hand, for H=15 cm, the illumination angle (t+s) in the first plane should be about 26.3°, and the illumination angle (p+q+r) in the second plane should be about 39.4°. Thus, for some computing devices (e.g., smartphones) whose dimensions are about 6 cm×12 cm, if the sensor module is located near the bottom (or top) of the device 10 at its centerline (in the width direction), the illumination angle (t+s) in a first plane falls in a range of about 26.3°-70.0°, whereas the illumination angle (p+q+r) in a second plane falls in a range of about 39.4°-72.2°.

FIG. 4E illustrates an example in which the sensor module is located near the corner of the smartphone (i.e., about 0.5 cm from the edge of the smartphone, such that d=6 cm and e=1 cm). In that case, the sensor module can be arranged such that, for H=5 cm, the illumination angle (t+s) in the first plane is about 61.5°, and the illumination angle (p+q+r) in the second plane is about 72.2°. On the other hand, for H=15 cm, the illumination angle (t+s) in the first plane should be about 25.6°, and the illumination angle (p+q+r) in the second plane should be about 39.4°. Thus, for some computing devices (e.g., smartphones) whose dimensions are about 6 cm×12 cm, if the sensor module is located near a corner of the device 10, the illumination angle (t+s) in a first plane falls in a range of about 25.6°-61.5°, whereas the illumination angle (p+q+r) in a second plane falls in a range of about 39.4°-72.2°.

As is apparent from the foregoing examples of FIGS. 4C-4E, for some computing devices (e.g., smartphones), the sensor module can be located anywhere within a zone 62 near the bottom or top of device—where the zone extends from the centerline of the device to near a corner of the device (e.g., about 0.5 cm from the edge of the device). The module can be arranged to have an illumination angle (t+s) in a first plane falls in a range of about 25.6°-70.0°, whereas the illumination angle (p+q+r) in a second plane falls in a range of about 39.4°-72.2°. The illumination angles in both planes should be selected so that the illumination from the sensor module reaches substantially all points directly above the surface of the device 60 at a specified distance from the surface of the device. Other dimensions and illumination angles may be appropriate for some implementations.

Multiple modules as described above can be fabricated, for example, at the same time in a wafer-level process. As part of such a process, the following wafers can be attached to one another to form a vertical stack in the following order: a first (support) wafer provided with multiple light emitting elements 24 and multiple integrated circuit chips 20 mounted on its surface; a second (spacer) wafer having openings (i.e., through-holes) that correspond to the locations of the optical emission and detection channels; a third (optics substrate) wafer with multiple groups of lens elements 28, 30 on its surface(s); and a fourth (baffle) wafer with openings corresponding to the areas for the optical channels.

The first (support) wafer can be composed, for example, of a PCB material such as FR4. The second (spacer) wafer can be composed, for example, of a polymer material (e.g., epoxy, acrylate, polyurethane, or silicone) containing a non-transparent filler (e.g., carbon black, a pigment, inorganic filler, or dye). In the resulting modules, the second (spacer) wafer provides the outer walls 50 of the module, the inner wall 34 that separates the light emission channel from the light detection channels, and the inner walls 36, 38 that separate the optical detection channels from one another. The third (optics substrate) wafer can be composed, for example, of a PCB material (such as FR4) or other molded or machined material (such as a non-transparent epoxy) with openings that are filled with transmissive material (e.g., glass or plastic) corresponding to the areas where the lenses are formed. The fourth (baffle) wafer also can be composed, for example, of a non-transmissive material like the spacer wafer. After the wafer stack is formed by attaching the foregoing wafers to one another, the stack can be separated (e.g., by dicing) to form individual modules such as the module of FIGS. 3A-3D.

As described in the preceding paragraphs, the sensor module can be formed by stacking discrete wafers (i.e., support wafer, a spacer wafer, an optics wafer) into a stack, which then is diced. Alternatively, spacers can be replicated directly onto the support wafer and/or the optics wafer, for example, by vacuum injection. In such a case, the optics wafer/spacer assembly and the support wafer/spacer assembly then can be stacked and diced to form the individual sensor modules. Also, in some implementations, a single combined replication and vacuum injection tool can be used to form the lens on the optics wafer (by replication) and to form the spacer elements (by vacuum injection).

A module like that of FIGS. 3A-3D can be assembled, for example, into a hand-held computing device such as a smartphone or tablet. In particular, the module can be positioned beneath the window 14 of the device 10 such that the lens elements 28 for the different optical detection channels can receive and direct incoming light to the associated light detecting elements 22. Signal processing circuitry in the device 10 can receive signals from the integrated circuit chip 20 and can process the signals to distinguish between hand gestures that involve movement across the different light detection zones 18A, 18B, 18C, 18D (see FIGS. 2A and 2B). As explained above, in some implementations, the light detection zones, collectively, encompass substantially the entire space (or a significant portion of the space) within a range of heights (e.g., 5-15 cm) directly above the surface of the device 10, which facilitates detection of a user's hand gestures.

Figure 5A:
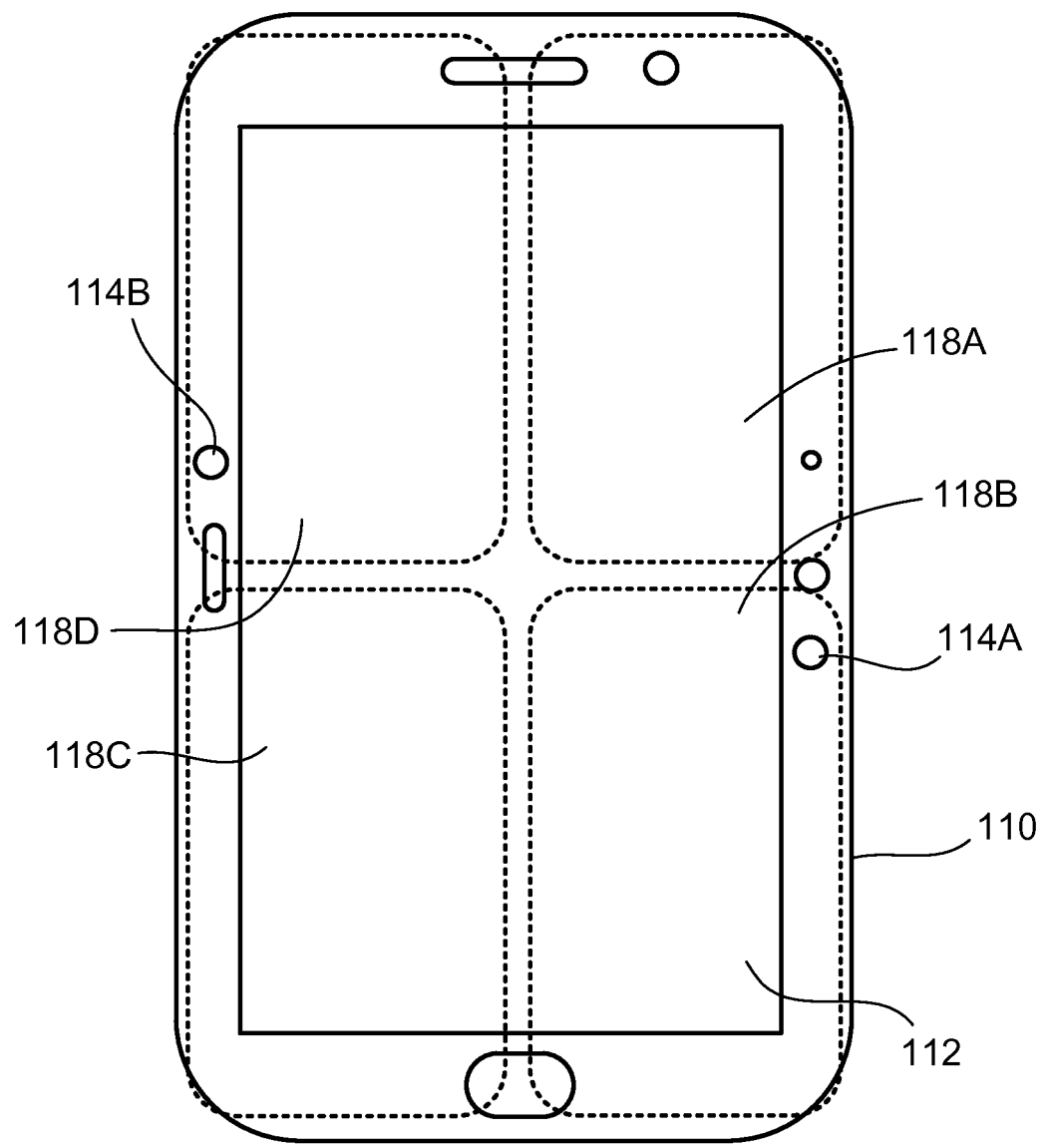
FIG. 5A illustrates an example of a computing device including multiple sensor modules in accordance with the invention.

For some applications (e.g., a small handheld mobile phone), it may be sufficient to incorporate a single sensor module as described above into the device. In such instances, the detection zones provided by the module may provide sufficient coverage of the area directly above the front surface of the device such that hand gestures or movement of other objects can be readily detected. In other applications (e.g., an electronic tablet having a relatively large display), it may be desirable to incorporate two or more sensor modules into the device such that each sensor module covers a different subset of detection zones above the front surface of the device. An example is illustrated in FIG. 5A, which shows an electronic tablet device 110 that includes a relatively large display screen 112. A respective sensor module is located beneath each of two transparent windows 114A, 114B located on opposite sides of the device 110. The sensor module below the first window 114A provides light emission and detection for two of the detection zones 118A, 118B, whereas the sensor module below the second window 114B provides light emission and detection for another two of the detection zones 118C, 118D. In this example, each sensor module includes a single light emitter element and 1×2 array of light detection elements.

Figure 5B:
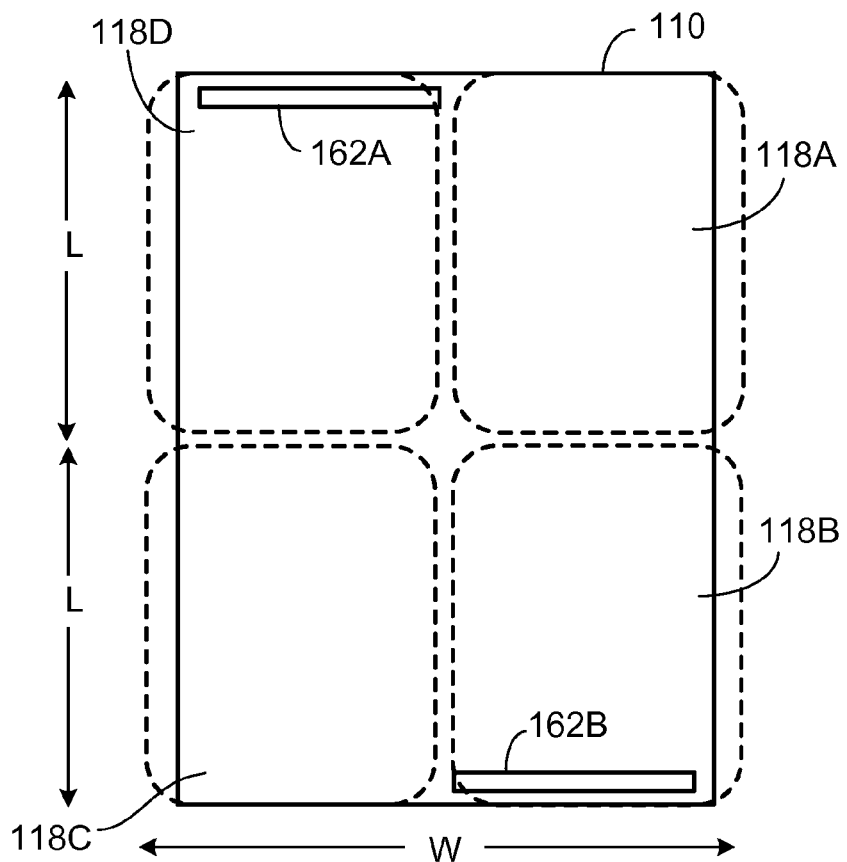
FIGS. 5B and 5C illustrate various dimensions for sensor module positions in a hand-held computing device.

FIG. 5B illustrates another example of possible locations of the sensor modules in various hand-held computing devices such as tablets. For the purpose of illustration, it is assumed that the tablet 110 of FIG. 5B has a width of about 18 cm and a length of about 24 cm (i.e., a portrait orientation). In the illustrated example, a first sensor module is located within a zone 162A near the top of the tablet 110 below detection zone 118D, and a second sensor module is located within a zone 162B near the bottom of the tablet below detection zone 118B. Each zone 162A, 162B extends from the centerline of the tablet 110 to about 0.5 cm from the edge of the tablet (i.e., near a corner of the tablet). Each sensor module is arranged to illuminate about half of the space directly above the tablet 110. Thus, the first sensor module can be arranged to illuminate the area for detection zones 118A, 118D, whereas the second sensor module can be arranged to illuminate the area for detection zones 118B, 118C. The dimensions shown in FIG. 5B for this example are W=19 cm, and L=12 cm. Here too, it is assumed that the detection zones 18A-18D extend about 0.5 cm beyond the edges of the tablet (in the width direction)

If the sensor modules in FIG. 5B are located in their respective zones 162A, 162B at the centerline of the tablet 110, each sensor module can be arranged such that, for H=5 cm, the illumination angle (t+s) in the first plane is about 124.5°, and the illumination angle (p+q+r) in the second plane is about 72.2° (see FIG. 4A for an illustration of the angles t, s, p, q and r). On the other hand, for H=15 cm, the illumination angle (t+s) in the first plane should be about 64.7°, and the illumination angle (p+q+r) in the second plane should be about 39.4°. Thus, for some computing devices (e.g., tablets) whose dimensions are about 18 cm×24 cm, if the sensor modules are located near the bottom and top of the device 110 at its centerline (in the width direction), the illumination angle (t+s) in a first plane should fall in a range of about 64.7°-124.5°, whereas the illumination angle (p+q+r) in a second plane should fall in a range of about 39.4°-72.2°.

If the sensor modules in FIG. 5B are located in their respective zones 162A, 162B near the corners of the tablet 110 (i.e., about 0.5 cm from the edge of the tablet) each sensor module can be arranged such that, for H=5 cm, the illumination angle (t+s) in the first plane is about 85.8°, and the illumination angle (p+q+r) in the second plane is about 72.2°. On the other hand, for H=15 cm, the illumination angle (t+s) in the first plane should be about 54.0°, and the illumination angle (p+q+r) in the second plane should be about 39.4°. Thus, for some computing devices (e.g., tablets) whose dimensions are about 18 cm×24 cm, if the sensor modules are located near opposite corners of the device 110, the illumination angle (t+s) in a first plane should fall in a range of about 45.0°-124.5°, whereas the illumination angle (p+q+r) in a second plane should fall in a range of about 39.4°-72.2°.

As is apparent from the foregoing example of FIG. 5B, for some computing devices (e.g., tablets), the sensor modules can be located anywhere within respective zones 162A and 162B near the bottom or top of device—where each zone extends from the centerline of the device to near a corner of the device (e.g., about 0.5 cm from the edge of the device). Each module can be arranged to have an illumination angle (t+s) in a first plane that falls in a range of about 54.0°-124.5°, whereas the illumination angle (p+q+r) in a second plane falls in a range of about 39.4°-72.2°. The illumination angles should be selected so that the illumination from each sensor module reaches substantially all points directly above about one-half of the surface of the device (at a specified distance from the surface of the device). Other dimensions and illumination angles may be appropriate for some implementations.

Figure 5C:
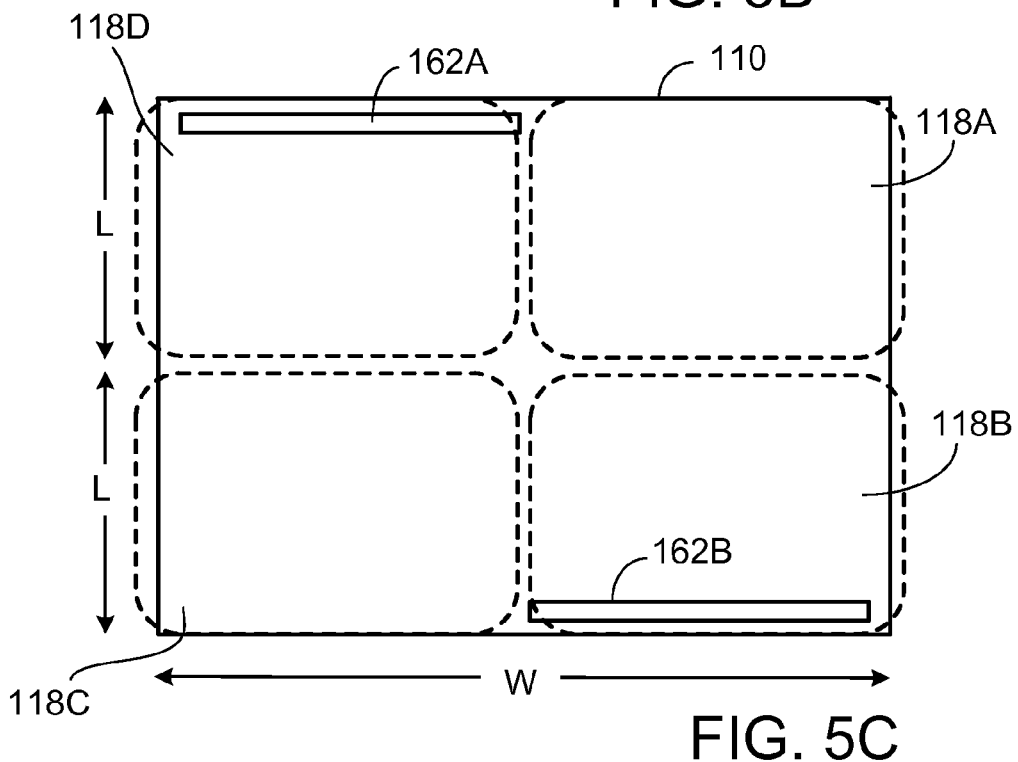

FIG. 5C illustrates another example of possible locations of the sensor modules in various hand-held computing devices such as tablets. For the purpose of illustration, it is assumed that the tablet 110 of FIG. 5B has a width of about 24 cm and a length of about 18 cm (i.e., a landscape orientation). In the illustrated example, a first sensor module is located within a zone 162A near the top of the tablet 110 below detection zone 118D, and a second sensor module is located within a zone 162B near the bottom of the tablet below detection zone 118B. Each zone 162A, 162B extends from the centerline of the tablet 110 to about 0.5 cm from the edge of the tablet (i.e., near a corner of the tablet). Each sensor module is arranged to illuminate about half of the space directly above the tablet 110. Thus, the first sensor module can be arranged to illuminate the area for detection zones 118A, 118D, whereas the second sensor module can be arranged to illuminate the area for detection zones 118B, 118C. The dimensions shown in FIG. 5C for this example are W=25 cm, and L=9 cm. Here too, it is assumed that the detection zones 18A-18D extend about 0.5 cm beyond the edges of the tablet (in the width direction)

If the sensor modules in FIG. 5C are located in their respective zones 162A, 162B at the centerline of the tablet 110, each sensor module can be arranged such that, for H=5 cm, the illumination angle (t+s) in the first plane is about 136.4°, and the illumination angle (p+q+r) in the second plane is about 53.4° (see FIG. 4A for an illustration of the angles t, s, p, q and r). On the other hand, for H=15 cm, the illumination angle (t+s) in the first plane should be about 79.6°, and the illumination angle (p+q+r) in the second plane should be about 22.0°. Thus, for some computing devices (e.g., tablets) whose dimensions are about 24 cm×18 cm, if the sensor modules are located near the bottom and top of the device 110 at its centerline (in the width direction), the illumination angle (t+s) in a first plane should fall in a range of about 61.8°-136.4°, whereas the illumination angle (p+q+r) in a second plane should fall in a range of about 22.0°-53.4°.

If the sensor modules in FIG. 5C are located in their respective zones 162A, 162B near the corners of the tablet 110 (i.e., about 0.5 cm from the edge of the tablet) each sensor module can be arranged such that, for H=5 cm, the illumination angle (t+s) in the first plane is about 89.5°, and the illumination angle (p+q+r) in the second plane is about 53.4°. On the other hand, for H=15 cm, the illumination angle (t+s) in the first plane should be about 61.8°, and the illumination angle (p+q+r) in the second plane should be about 22.0°. Thus, for some computing devices (e.g., tablets) whose dimensions are about 24 cm×18 cm, if the sensor modules are located near opposite corners of the device 110, the illumination angle (t+s) in a first plane should fall in a range of about 61.8°-136.4°, whereas the illumination angle (p+q+r) in a second plane should fall in a range of about 22.0°-53.4°.

As is apparent from the foregoing example of FIG. 5C, for some computing devices (e.g., tablets), the sensor modules can be located anywhere within respective zones 162A and 162B near the bottom or top of device—where each zone extends from the centerline of the device to near a corner of the device (e.g., about 0.5 cm from the edge of the device). Each module can be arranged to have an illumination angle (t+s) in a first plane that falls in a range of about 61.8°-136.4°, whereas the illumination angle (p+q+r) in a second plane falls in a range of about 22.0°-53.4°. The illumination angles should be selected so that the illumination from each sensor module reaches substantially all points directly above about one-half of the surface of the device (at a specified distance from the surface of the device). Other dimensions and illumination angles may be appropriate for some implementations.

Figure 6A:
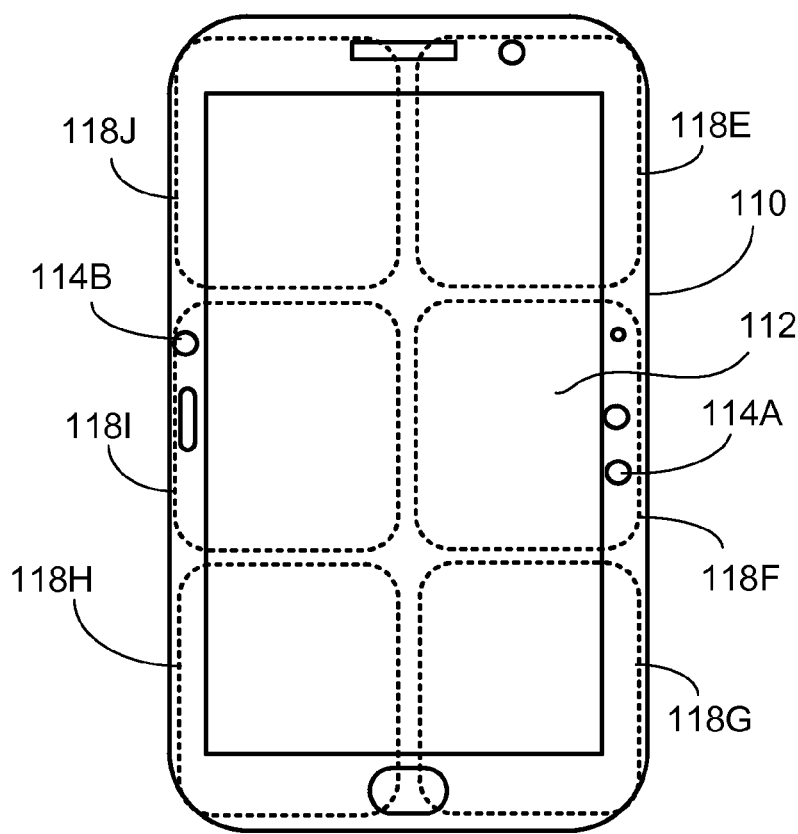
FIG. 6A illustrates another example of a computing device including multiple sensor modules in accordance with the invention.
Figure 6B:
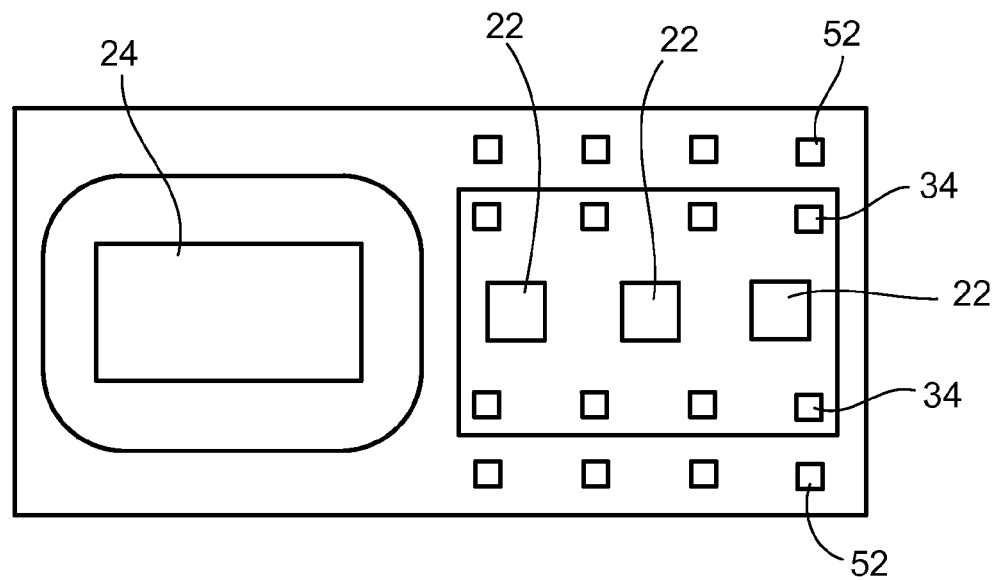
FIG. 6B illustrates further details of another example of a sensor module according to the invention.

Although the foregoing examples divide the space above the front surface of the device into four detection zones (e.g., 18A-18D; or 18E-18H; or 118A-118D), in other implementations, there may be a different number of detection zones. For example, FIG. 6A illustrates an example in which the space above the display screen 112 on the front surface of the device 110 is divided into six detection zones 118E through 118J. A respective sensor module is located beneath each of two transparent windows 114A, 114B located on opposite sides of the device 110. The sensor module below the first window 114A provides light emission and detection for three of the detection zones 118E-118G, whereas the sensor module below the second window 114B provides light emission and detection for another three of the detection zones 118H-118J. In this example, each sensor module includes a single light emitter element 24 and 1×3 array of light detection elements 22 (see FIG. 6B).

In the foregoing examples, the sensor module is located beneath a transparent window (e.g., 14, 114A or 114B) that is separate from the sensor module (e.g., a glass over the front surface of the device). In some implementations, the sensor module itself can include a transparent window over the optics substrate 56.

Examples of the types of hand gestures that can be detected and distinguished from one another in some implementations are discussed below. Depending on the implementation, each of the hand gestures can be interpreted, for example, as a user command or instruction that triggers a predetermined response by the device 10 (or 110). Preferably, the sensor module functions to detect transitions from one detection zone to another (e.g., a transition across the median line of the device).

FIG. 7A, for example, illustrates a hand gesture involving a leftward movement in which a user moves her hand from the second detection zone 18B to the third detection zone 18C. Likewise, FIG. 7B illustrates a hand gesture involving rightward movement in which a user moves her hand from an area encompassing both the third and fourth detection zones 18C, 18D to an area encompassing both the first and second detection zones 18A, 18B. Some implementations can detect upward and downward hand gestures. For example, FIG. 7C illustrates an example of an upward hand gesture in which a user moves her hand from an area encompassing both the second and third detection zones 18B, 18C to an area encompassing both the first and fourth detection zones 18A, 18D. Likewise, FIG. 7D illustrates a hand gesture involving a downward movement in which a user moves her hand from the fourth detection zone 18D to the third detection zone 18C. In these examples, motion can be detected so long as the user's hand passes over the mid-section of the front surface of the device 10 (i.e., across the central axis of the device in either the x or y direction). The motion can be detected, for example, by monitoring each of the quadrants 18A-18D individually or in pairs.

Figure 7E:
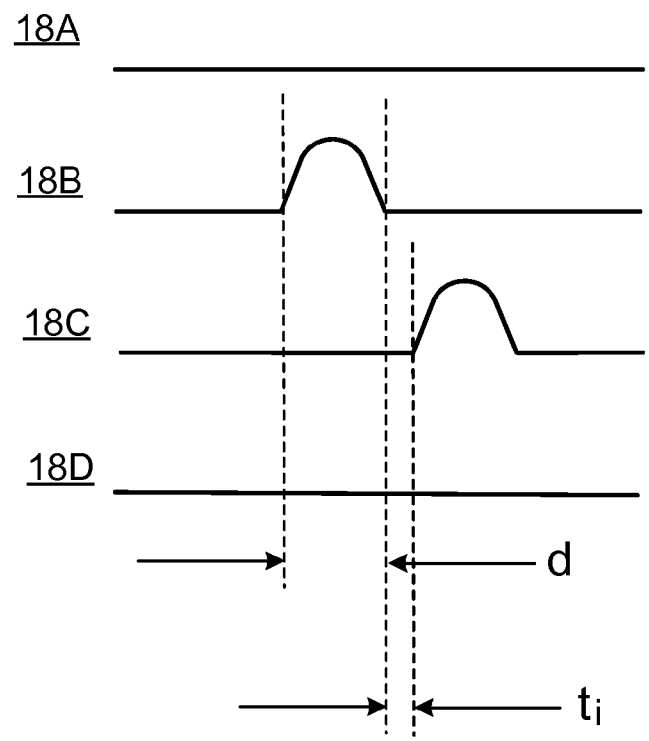
FIGS. 7E and 7F are timing diagrams illustrating signals, associated, respectively, with the examples of FIGS. 7A and 7B.
Figure 7F:
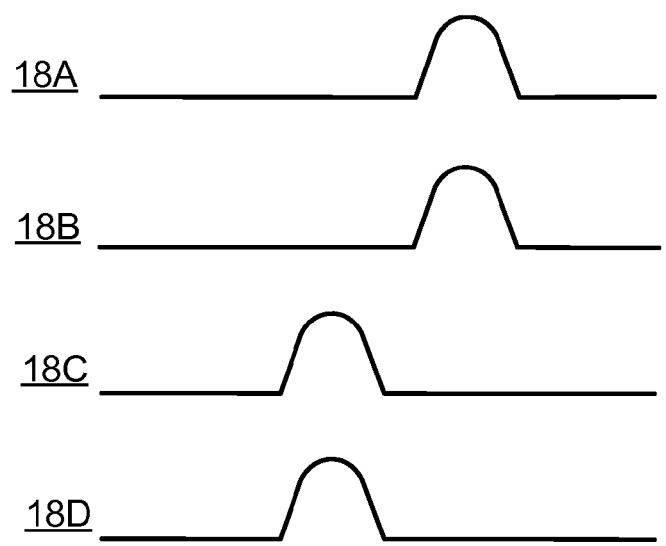

To detect the foregoing types of motion, the various light detecting elements 22 would detect signals in a predetermined sequence. For example, FIG. 7E illustrates an example of the signals detected, respectively, by the light detecting elements 22 associated, respectively, with the detection zones 18A-18D for the hand gesture shown in FIG. 7A. Likewise, FIG. 7F illustrates an example of the signals detected, respectively, by the light detecting elements 22 associated, respectively, with the detection zones 18A-18D for the hand gesture shown in FIG. 7B. The sequences of signals (e.g., in FIG. 7E or 7F) can be recognized, for example, by processing circuitry so as to trigger an appropriate response by the device.

The magnitude of the analog signal detected by a particular light detecting element 22 can indicate whether that light detecting element detected the presence of an object in the corresponding detection zone. For example, if the detected signal exceeds a specified threshold and has a duration (d) of at least a minimum specified time, the signal would indicate that an object is present in the corresponding detection zone. This technique also be used for analog-to-digital conversion of the sensor signal. The time interval ($t_i$) between detected events can be positive, negative or zero, depending on the implementation.

Figure 8:
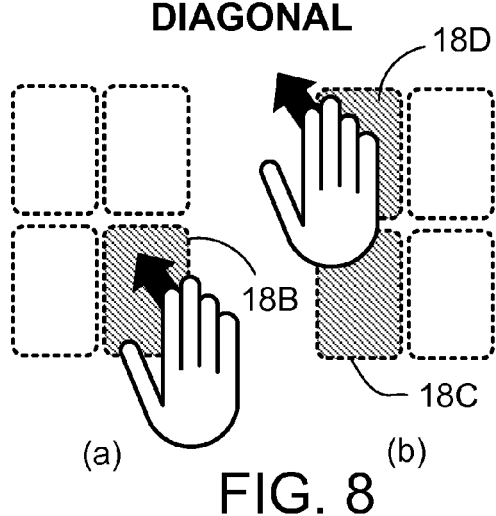
FIGS. 8, 9 and 10 illustrate further examples of hand gestures.
Figure 9:
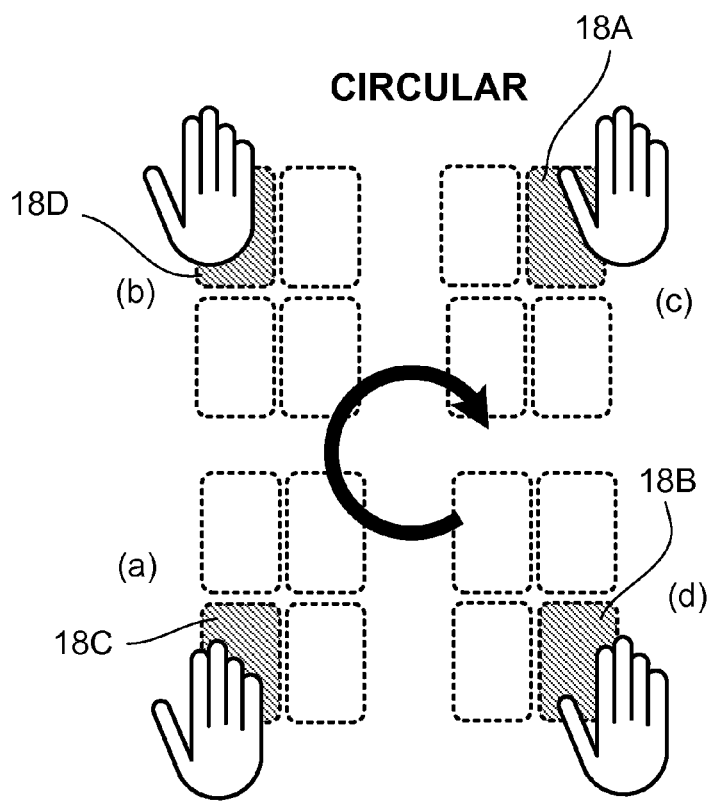

In some implementations, other types of hand gestures can be detected and recognized. For example, FIG. 8 illustrates a diagonal gesture in which the user's hand moves diagonally from the second detection zone 18B to an area that over both the third and fourth detection zones 18C, 18D. Similarly, FIG. 9 shows an example of circular motion in which the user's hand moves from the third detection zone 18C to the fourth detection zone 18D, and then to the first detection zone 18A and finally to the second detection zone 18B.

Figure 10:
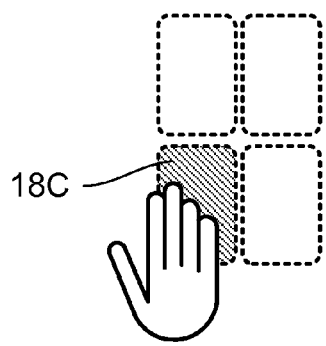

FIG. 10 illustrates another type of user command or instruction that can be made, for example, by the user holding her hand over a particular detection zone, such as zone 18C, for at least a predetermined duration. Thus, when the module detects that an object is present in a particular detection zone for a duration equal to or exceeding a predetermined time, it can trigger, for example, opening of a menu on the device or some other user interface functionality.

Various modifications can be made within the spirit of the invention. Accordingly, other implementations are within the scope of the claims.

What is claimed is:

1. A hand-held device comprising an outer surface and at least one opto-electronic module operable to emit and receive light through a window in the outer surface, wherein each opto-electronic module comprises:
    a light emitting element mounted on a first area of a support;
    an integrated circuit chip mounted on a second area of the support and including a plurality of light detecting elements, the integrated circuit chip including circuitry to process signals from the light detecting elements,
    wherein the light detecting elements and the light emitting element are disposed in respective optical channels of the module,
    the module further including:
        a first passive optical element in an optical emission channel associated with the light emitting element and arranged such that light from the light emitting element that passes through the first passive optical element and through the window in the outer surface of the hand-held device has a central axis of emission forming an angle of less than ninety degrees with the outer surface of the hand-held device and spreads so that the light subsequently reaches at least part of a specified plane directly above the outer surface of the hand-held device; and
        second passive optical elements each of which is in a respective optical detection channel associated with a respective one of the light detecting elements, wherein each of the second passive optical elements comprises a lens element that subtends a respective range of angles that differs from the respective range of angles subtended by each of the other second passive optical elements such that each second optical element is arranged to receive light from a different one of a plurality of light detection zones that encompass areas illuminated by the first passive optical element, and wherein each of the second passive optical elements is arranged to direct the received light to an associated one of the light detecting elements in the respective optical detection channel for that passive optical element.

2. The hand-held device of claim 1 wherein light from the light emitting element that passes through the first passive optical element and through the window in the outer surface of the hand-held device has a central axis of emission forming an angle of less than eighty degrees with the outer surface of the hand-held device.

3. The hand-held device one of claim 1 wherein the specified plane is located in a range of 5 cm to 15 cm above the surface of the device.

4. The hand-held device of any one of claim 1 further including a display screen at the outer surface.

5. The hand-held device of claim 1 wherein the first passive element includes at least one of a diffractive lens, a Fresnel lens, or a Fresnel lens with multiple sections.

6. The hand-held device of claim 1 wherein light from the light emitting element that passes through the first passive element has an illumination angle in a first plane in a range of 25.6°-70.0° and an illumination angle in a second plane in a range of 39.4°-72.2°, wherein the second plane is substantially perpendicular to the first plane.

7. The hand-held device of claim 1 wherein light from the light emitting element that passes through the first passive element has an illumination angle in a first plane in a range of 54.0°-124.5° and an illumination angle in a second plane in a range of 39.4°-72.2°, wherein the second plane is substantially perpendicular to the first plane.

8. The hand-held device of claim 1 wherein light from the light emitting element that passes through the first passive element has an illumination angle in a first plane in a range of 61.8°-136.4° and an illumination angle in a second plane in a range of 22.0°-53.4°, wherein the second plane is substantially perpendicular to the first plane.

9. The hand-held device of claim 1 wherein the plurality of light detecting elements includes at least four light detecting elements.

10. The hand-held device of claim 9 wherein each of the four light detecting elements is arranged to detect reflected light from a different one of four light detection zones in the specified plane, wherein each of the light detection zones encompasses a different area of space directly above the outer surface of the device.

11. The hand-held device of claim 1 wherein the opto-electronic module includes a non-transparent wall separating the optical emission channel for the light emitting element from the optical detection channels for the light detecting elements.

12. The hand-held device of claim 1 wherein the opto-electronic module further includes one or more walls separating the optical detection channels from one another.

13. The hand-held device of claim 1 wherein the light emitting element is operable to emit infra-red light and wherein the light detecting elements are operable to detect infra-red light.

14. The hand-held device of claim 1 wherein:
    light from the light emitting element that passes through the first passive optical element spreads so that the light reaches substantially all areas of the specified plane that are directly above the outer surface of the device, and
    the light detection zones encompass substantially all the areas of the specified plane that are directly above the outer surface of the device.

15. The hand-held device of claim 1 wherein the hand-held device is a smartphone.

16. The hand-held device of claim 1 wherein the hand-held device is an electronic tablet or notepad.

17. The method of claim 16 wherein the detection zones are in a plane located in a range of 5 cm to 15 cm above the outer surface of the hand-held device.

18. The method of claim 16 wherein there is a display screen at the outer surface of the hand-held device.

19. A method of operating an opto-electronic module in a hand-held device, the method comprising:
emitting light from a light emitting element in the module through a first passive optical element in the module such that after passing through the first passive optical element and through an outer surface of the hand-held device, the light has a central axis of emission forming an angle of less than ninety degrees with an outer surface of the hand-held device;
receiving, in an integrated chip, reflected light by an object moving above the outer surface of the hand-held device, wherein parts of the reflected light are received by way of respective ones of a plurality of second passive optical elements, wherein each of the second passive optical elements comprises a lens element that subtends a respective range of angles that differs from the respective range of angles subtended by each of the other second passive optical elements such that each second optical element is arranged to receive reflected light from a different one of a plurality of light detection zones directly above the outer surface of the hand-held device; and
directing the received light from the second passive optical elements to light detecting elements in the module, wherein each light detecting element is associated with a respective one of the second passive optical elements.

20. The method of claim 19 wherein the light from the light emitting element that passes through the first passive optical element and through the outer surface of the hand-held device has a central axis of emission forming an angle of less than eighty degrees with the outer surface of the hand-held device.

21. The method of claim 20 wherein light from the light emitting element that passes through the first passive optical has an illumination angle in a first plane in a range of 25.6°-70.0° and an illumination angle in a second plane in a range of 39.4°-72.2°, wherein the second plane is substantially perpendicular to the first plane.

22. The method of claim 20 wherein light from the light emitting element that passes through the first passive element has an illumination angle in a first plane in a range of 54.0°-124.5° and an illumination angle in a second plane in a range of 39.4°-72.2°, wherein the second plane is substantially perpendicular to the first plane.

23. The method of claim 20 wherein light from the light emitting element that passes through the first passive element has an illumination angle in a first plane in a range of 61.8°-136.4° and an illumination angle in a second plane in a range of 22.0°-53.4°, wherein the second plane is substantially perpendicular to the first plane.

* * * * *